Patented June 23, 1953

2,643,236

UNITED STATES PATENT OFFICE 2,643,236

METHOD OF PREPARING CONDENSATION PRODUCTS OF PENTAERYTHRITOL AND GLYOXAL

Edward L. Kropa, Old Greenwich, and Walter M. Thomas, Springdale, Conn., assignors to American Cyanamid Company, New York, N. Y., a corporation of Maine No Drawing. Application December 29, 1950, Serial No. 203,556

1 Claim. (Cl. 260—29.2)

This invention relates to the production of new synthetic materials and more particularly to new resinous (or potentially resinous) compositions which are especially suitable for use in, for example, the plastics, coating and textile-finishing arts. The invention specifically is concerned with compositions comprising a synthetic material which is a condensation product, more particularly a resinous or potentially resinous condensation product, of ingredients consisting of (1) an aldehyde including glyoxal and (2) at least one hydroxy compound of the class consisting of pentaerythritol and polypentaerythritols, e. g., di-, tri-, tetra- and higher polypentaerythritols. From this it will be seen that the compositions of the present invention embrace condensation products of glyoxal and pentaerythritol and/or a polypentaerythritol, for example, a condensation product of glyoxal and a polypentaerythritol including dipentaerythritol. The scope of the invention also includes method features.

It has been suggested in prior patents that reaction products of an aldehyde (of which glyoxal incidentally has been mentioned as an example) and many different kinds of amidogen compounds (e. g., various substituted aminotriazines) can be modified by incorporating therein various polyhydric alcohols, among which pentaerythritol and dipentaerythritol have been mentioned. Typical of such disclosures is that appearing in Kropa and Padbury Patent No. 2,523,470, and from which it will be seen that the primary or fundamental reaction product is not a condensation product of the aldehyde and the alcohol; instead, the alcohol is employed merely for the purpose of modifying the properties of the fundamental resin obtained by reaction between the amidogen compound and the aldehyde. It was also suggested prior to our invention that coating compositions, which can be air-dried or baked to yield tack-free films, can be produced from condensation products of pentaerythritol or other polyhydric alcohol and acrolein or methacrolein. However, to the best of our knowledge and belief, condensation products of ingredients consisting of, as the sole reactants, (1) an aldehyde including essentially glyoxal (and preferably glyoxal alone) and (2) pentaerythritol, or a polypentaerythritol (or a mixture of polypentaerythritols in any proportions), or a mixture of pentaerythritol and one or more polypentaerythritols in any proportions, were not known or suggested in the prior art prior to our invention.

It is a primary object of the present invention to provide a new class of synthetic materials, more particularly resinous or potentially resinous condensation products, which have particular utility in the plastics, coating and textile-finishing arts, e. g., as coating, laminating, adhesive, impregnating, textile-finishing, casting and molding compositions, or as components of such compositions, as well as in other applications.

Another object of the invention is to provide a new class of textile-treating agents by the use of which cotton and other fabrics can be improved in their useful properties, e. g., rendered resistant to shrinkage.

Other objects of the invention will be apparent to those skilled in the art from the following more detailed description.

These and other objects are accomplished as broadly described in the first paragraph of this specification and more fully hereafter.

In general, the products of our invention are prepared by condensing together, under acidic conditions, ingredients consisting of (1) an aldehyde including a difunctional aldehyde, specifically glyoxal, and (2) pentaerythritol and/or a polypentaerythritol or plurality of polypentaerythritols. The acidic conditions, under which the condensation reaction is effected, result from the use of a small amount of an acidic or acid-forming condensation catalyst. The reaction proceeds more rapidly under heat, e. g., 40° or 50° C. up to 120° or 130° C. Higher temperatures are not precluded, e. g., 150°–200° C., but in such cases the reaction may be more difficult to control. The reaction is preferably effected while the reactants are dissolved or dispersed in a suitable inert liquid solvent or diluent, e. g., water, dioxane, etc. The condensation product can be isolated, if desired, from the liquid medium in which it was produced, e. g., by evaporation or distillation of the latter whereby the condensation product remains as a residue; or the solution of dispersion of the condensation product can be used directly (preferably after removal or neutralization of the acid therein) as a textile-treating agent or for other purposes.

The proportions of reactants may be widely varied as desired or as conditions may require, any excess over theoretical merely remaining in the reaction mass as unreacted material until subsequent separation, if desired, from the condensation product at the end of the reaction period. In order to obtain condensation products of higher molecular weight, it is usually desirable to use (1) pentaerythritol and/or a polypentaerythritol and (2) glyoxal in amounts such that there is present one proportion of glyoxal (i. e., two aldehyde groups) for each four hydroxy groups in the pentaerythritol or polypentaerythritol. (It may here be noted that even though pentaerythritol possesses four hydroxy groups, it behaves as a bifunctional reactant in a condensation reaction with glyoxal.) Cross-linked condensation products are readily produced by employing the more highly functional polypentaerythritols. Products of lower molecular weight can be obtained by using formaldehyde, acetaldehyde, propionaldehyde, butyraldehyde, valeraldehyde, hexaldehyde, heptaldehyde, octaldehyde or other monofunctional aldehyde along with the glyoxal, in proportions of from 5 to 50 mole per cent of the monofunctional aldehyde with respect to the total aldehyde, the remainder of the aldehydic reactant being glyoxal. The monofunctional aldehyde may be incorporated prior to or during the condensation reaction with the hydroxy compound or compounds.

If desired, relatively large excesses of glyoxal may be used in forming a condensation product thereof with pentaerythritol and/or one or more polypentaerythritols. For example, we can use from 1.5 to 10 or 15, or even as much as 20 or 30 or more moles of glyoxal for each mole of the hydroxy compound. However, no advantage appears to accrue from using a molar amount of glyoxal in excess of that required to form the desired condensation product.

As has been mentioned hereinbefore, the condensation reaction is effected under acidic conditions. Examples of acid condensation catalysts that can be used to promote the reaction are the mineral acids, e. g., sulfuric, phosphoric, hydrochloric, etc.; various organic acids, e. g., benzene sulfonic acid, p-toluene sulfonic acid, camphor sulfonic acid, etc.; various acidic salts or bodies, e. g., ferric chloride, aluminum chloride, alkyl acid sulfates (e. g., methyl acid sulfate), monosodium phosphate, boron fluoride, sodium and other alkali-metal acid sulfates, etc.; as well as others. The amount of acidic catalyst required will obviously vary with the particular reactants employed, the speed of reaction desired and other influencing factors, but ordinarily the amount of catalyst is, by weight, from 0.001% to 3 or 4% of the total weight of the reactants used.

In general, the condensation products of the present invention are spirane in nature. They constitute a new class of non-nitrogenous resinous (or potentially resinous) materials which are especially suitable for improving the useful properties of cellulosic materials, e. g., cotton textiles in fabric and other form, paper, etc. Solutions of our new condensation products are particularly useful as textile-treating agents, for example in treating cotton cloth to reduce its shrinkage on laundering and to improve its resistance to creasing. In contrast to the urea-formaldehyde, melamine-formaldehyde and other nitrogenous resins commonly used in treating textiles to improve their useful properties, the condensation products of our invention do not take up chlorine from bleaching solutions and, hence, result in no discoloration of textiles impregnated therewith.

In order that those skilled in the art better may understand how the present invention can be carried into effect, the following examples are given by way of illustration and not by way of limitation. All parts and percentages are by weight.

*Example 1*

Pentaerythritol, aqueous glyoxal and concentrated sulfuric acid were mixed and heated for 4–5 hours in an open reaction vessel placed on a steam bath. The proportions were as follows:

| Parts Pentaerthyritol | Parts 30.8% Glyoxal | Parts Conc. $H_2SO_4$ | Molar Ratio of Glyoxal to Pentaerythritol |
|---|---|---|---|
| 68 | 94 | 1 | 1:1 |
| 68 | 141 | 1 | 1.5:1 |
| 68 | 188 | 1 | 2:1 |

Clear, viscous syrups (liquid reaction products) were obtained in all cases. When films of these syrups were cast on glass panels, they air-dried quite rapidly to give hard, clear films. When the coated panels were baked for 30 minutes at 135° C., the films were substantially water-insoluble, hard, clear, and had good adhesion to the glass. Solutions applied to cotton cloth reduced the shrinkage on laundering and improved the resistance to creasing.

*Example 2*

Same as in Example 1 with the exception that 20 mole per cent of the glyoxal employed is replaced with 20 mole per cent of formaldehyde. Similar results are obtained. However, the molecular weight of the condensation product is somewhat lower, the syrupy condensation product is less viscous and the air-dried and baked films are not quite so hard as the corresponding products of the previous example.

*Example 3*

Condensation products of glyoxal and dipentaerythritol were prepared by mixing and heating the following ingredients in the specified amounts for 5 hours in an open reaction vessel placed on a steam bath:

| Parts Depentaerythritol | Parts Glyoxal | Parts Water | Parts 6 N $H_2SO_4$ | Molar Ratio of Glyoxal to Dipentaerythritol |
|---|---|---|---|---|
| 25.4 | 18.8 | 25 | 1.37 | 1:1 |
| 25.4 | 28.2 | 25 | 1.37 | 1.5:1 |
| 25.4 | 37.7 | 25 | 1.37 | 2:1 |

In all cases syrupy condensation products were obtained. They were cast on glass plates, drained and air-dried for about 16 hours, yielding hard, clear films. Similarly cast films were baked for 30 minutes at 135° C. The baked films were clear and very hard, had good adherence to the glass and showed no evidence of disintegration when immersed in water for 16 hours. As in the case of the products of Examples 1 and 2, so too can the aqueous solutions of the water-soluble condensation products of this example be used as textile-treating agents, e. g., in treating cotton fabrics.

Example 4

Same as in Example 3 with the exception that 50 mole per cent of the dipentaerythritol is replaced by 50 mole per cent of pentaerythritol. Similiar results are obtained. The products are especially suitable for use as textile-treating agents.

We claim:

The method of preparing a clear, viscous, syrupy reaction product that can be cast on a glass surface and air-dried thereon to yield a hard, clear film, said method comprising mixing and heating together the following ingredients for 4-5 hours, in an open reaction vessel, at a temperature corresponding to that produced by a steam bath: pentaerythritol, aqueous glyoxal and concentrated sulfuric acid, the aforesaid ingredients being employed in weight proportions corresponding to 68 parts pentaerythritol, 94 parts 30.8% aqueous glyoxal and 1 part concentrated sulfuric acid.

EDWARD L. KROPA.
WALTER M. THOMAS.

References Cited in the file of this patent

Read, Journal Chemical Soc. (London), vol. 101, 1912, pp. 2090 and 2094.